(12) United States Patent
Zacharias et al.

(10) Patent No.: US 9,023,116 B2
(45) Date of Patent: May 5, 2015

(54) ASSOCIATIVE THICKENER COMPRISING ACID MONOMER, ASSOCIATIVE MONOMER AND NONIONIC MONOMER

(75) Inventors: Philipp Zacharias, Mannheim (DE); Hermann Seyffer, Heidelberg (DE); Ilshat Gubaydullin, Ludwigshafen (DE); Harutyun Hanciogullari, Limburgerhof (DE); Marc Bothe, Monsheim (DE)

(73) Assignee: BASF SE, Ludwigshafen (DE)

( * ) Notice: Subject to any disclaimer, the term of this patent is extended or adjusted under 35 U.S.C. 154(b) by 417 days.

(21) Appl. No.: 13/018,777

(22) Filed: Feb. 1, 2011

(65) Prior Publication Data
US 2011/0189487 A1 Aug. 4, 2011

Related U.S. Application Data

(60) Provisional application No. 61/300,836, filed on Feb. 3, 2010.

(30) Foreign Application Priority Data

Feb. 3, 2010 (EP) .................................. 10152496

(51) Int. Cl.
| | |
|---|---|
| C08F 220/06 | (2006.01) |
| C08F 220/18 | (2006.01) |
| C08F 220/26 | (2006.01) |
| D21H 17/37 | (2006.01) |
| D21H 17/63 | (2006.01) |
| D21H 19/36 | (2006.01) |
| D21H 19/58 | (2006.01) |
| D21H 19/64 | (2006.01) |

(52) U.S. Cl.
CPC ............. C08F 220/06 (2013.01); C08F 220/18 (2013.01); C08F 220/26 (2013.01); Y10S 8/919 (2013.01)

(58) Field of Classification Search
CPC ..... C08F 220/06; C08F 220/18; C08F 220/26
USPC ........... 526/317, 317.1, 318, 319, 328, 328.5, 526/329.6; 8/637.1, 115.6, 552, 557, 558, 8/618, 625, 626, 629, 919
See application file for complete search history.

(56) References Cited

U.S. PATENT DOCUMENTS

| | | | |
|---|---|---|---|
| 5,770,760 A * | 6/1998 | Robinson | ....................... 560/221 |
| 5,874,495 A | 2/1999 | Robinson | |
| 7,288,616 B2 * | 10/2007 | Tamareselvy et al. | ........ 526/333 |
| 2007/0155880 A1 | 7/2007 | Bobsein et al. | |
| 2011/0091733 A1 | 4/2011 | Feuerhake et al. | |
| 2011/0143156 A1 | 6/2011 | Cimpeanu et al. | |
| 2011/0305916 A1 | 12/2011 | Schmidt-Thümmes et al. | |
| 2012/0058641 A1 | 3/2012 | Raman et al. | |
| 2012/0058643 A1 | 3/2012 | Raman et al. | |
| 2012/0148855 A1 | 6/2012 | Cimpeanu et al. | |
| 2012/0235081 A1 | 9/2012 | Raman et al. | |

FOREIGN PATENT DOCUMENTS

| | | |
|---|---|---|
| EP | 0 011 806 A1 | 6/1980 |
| EP | 0 013 836 A1 | 8/1980 |
| EP | 0 216 479 A1 | 4/1987 |
| WO | WO 2004/076743 A2 | 9/2004 |
| WO | WO 2007/031419 A1 | 3/2007 |
| WO | WO 2010/127937 A1 | 11/2010 |
| WO | WO 2010/127938 A1 | 11/2010 |
| WO | WO 2011/023587 A2 | 3/2011 |
| WO | WO 2011/064734 A1 | 6/2011 |

OTHER PUBLICATIONS

International Search Report issued on Jul. 4, 2011 in corresponding International Application No. PCT/EP2011/051275 filed on Jan. 31, 2011 (with an English Translation of Categories).
U.S. Appl. No. 13/580,039, filed Aug. 20, 2012, Raman, et al.
U.S. Appl. No. 14/356,530, filed May 6, 2014, Seyffer, et al.
U.S. Appl. No. 14/360,803, filed May 27, 2014, Seyffer, et al.

\* cited by examiner

*Primary Examiner* — Amina Khan
(74) *Attorney, Agent, or Firm* — Oblon, McClelland, Maier & Neustadt, L.L.P.

(57) ABSTRACT

As associative thickener obtainable by free radical polymerization, the preparation thereof and the use thereof in paper coating slips are described. The associative thickener is formed from (a) acid monomers selected from ethylenically unsaturated $C_3$- to $C_8$-carboxylic acids, (b) associative monomers of the general formula $H_2C=CR^1-COO-(EO)_n-(PO)_m-R^2$, in which $R^1$ is hydrogen or methyl, n is a number of at least two, m is a number from zero to 50, EO is an ethylene oxide group, PO is a propylene oxide group and $R^2$ is a $C_8$-$C_{30}$-alkyl group or a $C_8$-$C_{30}$-alkaryl group, and (c) nonionic, copolymerizable monomers differing from a) and b), the reaction product having been reacted, after the polymerization, with initiators forming nonionic radicals.

7 Claims, No Drawings

ASSOCIATIVE THICKENER COMPRISING ACID MONOMER, ASSOCIATIVE MONOMER AND NONIONIC MONOMER

The invention relates to an associative thickener obtainable by free radical polymerization, the preparation thereof and the use thereof in paper coating slips. The associative thickener is formed from (a) acid monomers selected from ethylenically unsaturated $C_3$- to $C_8$-carboxylic acids, (b) associative monomers of the general formula $H_2C=CR^1$—COO-$(EO)_n$—$R^2$, in which $R^1$ is hydrogen or methyl, n is a number of at least two and $R^2$ is a $C_8$-$C_{30}$-alkyl group or a $C_8$-$C_{30}$-alkaryl group, and (c) nonionic, copolymerizable monomers differing from (a) and (b), the reaction product having been reacted, after the polymerization, with initiators forming nonionic radicals.

When improving the printability and the optical appearance of paper and cardboard, paper and cardboard surfaces are frequently coated with so-called paper coating slips. In addition to water, paper coating slips generally comprise pigments, binders and assistants for establishing the required rheological properties, e.g. thickeners. By means of paper coating slips, base papers acquire the desired mechanical and optical properties. Binders should fix the pigments on the paper and ensure the cohesion in the coating obtained. The papers coated with the paper coating slips should in particular be readily printable. The paper coating slips can be applied to an advancing paper web by means of suitable rolls, excess coating slip being scraped off with a blade and recycled to the storage container of the coating slip. For simple and problem-free processing of the aqueous paper coating slip, rheological behavior tailored to the processing method is desired. On application with low shearing, the viscosity should be as high as possible; when scraping off with high shearing, the viscosity should be as low as possible. Moreover, the rheological behavior during continuous application with recycling of scraped-off material should remain constant for as long as possible. Owing to the absorptive effect of the paper, water is constantly withdrawn from the coating slip and undesired viscosity increases may occur as a result. Coating slips which have as good a water retention as possible are therefore desired. Coating slips having as high a solids content as possible are also desired, since less water has to be removed on drying and energy costs can be saved.

The thickener composition used for the preparation of the coating slips should therefore have as high a concentration as possible but nevertheless should initially have a low viscosity and display its thickening effect only on use (e.g. by pH adjustment). Highly concentrated but nevertheless low-viscosity polymer concentrations can be prepared, for example, as polymer dispersions by emulsion polymerization, but the achievable chain length of the polymers is frequently limited (particularly in the case of acrylic acid polymers) and the water retention of the paper coating slips prepared therewith is still not completely satisfactory. The water retention can be adversely affected by interaction with the other constituents of a paper coating slip. These are complex influencing factors whose effects are difficult to foresee. The use of associative thickeners for adjusting the rheological properties of paper coating slips is disclosed in WO 2004/076743. Associative thickeners and their use, inter alia in paper coating slips, are also disclosed in EP 0011806. Associative thickeners for other intended uses are disclosed in EP 0013836, EP 0216479 and US 2007/0155880. The properties of the known thickener systems with regard to optimization of viscosity at low shear, viscosity at high shear and water retention are still not completely satisfactory in the case of paper coating applications.

It was an object of the present invention to provide thickeners, in particular for uses in paper coating slips, having good rheological application profile and good water retention.

The invention relates to an associative thickener formed by free radical polymerization of
a) at least one acid monomer selected from ethylenically unsaturated $C_3$- to $C_8$-carboxylic acids;
b) at least one associative monomer of the general formula

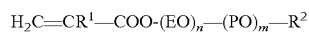

in which $R^1$ is hydrogen or methyl, n is a number of at least two, m is a number from zero to 50, EO is an ethylene oxide group, PO is a propylene oxide group and $R^2$ is a $C_8$-$C_{30}$-alkyl group or a $C_8$-$C_{30}$-alkaryl group,
c) nonionic, copolymerizable monomers differing from a) and b); the reaction product having been reacted, after the polymerization, with initiators forming nonionic radicals.

Associative thickeners are hydrophilic, water-soluble or water-swellable polymers having hydrophobic terminal or side groups. The hydrophobic terminal or side groups are water-insoluble. The structure of the associative thickeners is similar to that of surface-active substances. The interaction of the hydrophilic terminal or side groups with one another results in a high viscosity at low shear load.

The amount of acid monomers a) is preferably at least 25% by weight, for example from 25 to 55 or from 30 to 55% by weight or from 35 to 50% by weight, particularly preferably, in the case of methacrylic acid, at least 40% by weight, for example from 40 to 55% by weight, based on the sum of all monomers. The acid monomers are ethylenically unsaturated $C_3$- to $C_8$-carboxylic acid, in particular alpha, beta-ethylenically unsaturated $C_3$- to $C_8$-carboxylic acids which are capable of free radical polymerization. Preferred acid monomers have the general formula

in which R is H, $CH_3$ or COOX, R' being H, $C_1$-$C_4$-alkyl or $CH_2COOX$ if R is H, and R' being H if R is $CH_3$, and R' being H or $CH_2COOX$ if R is COOX, X being H or $C_1$-$C_4$-alkyl.

Acid monomers are, for example, acrylic acid, methacrylic acid, itaconic acid, fumaric acid, crotonic acid, aconitic acid and maleic acid and, in the case of polycarboxylic acids, the corresponding monoesters or partial esters thereof. The acid monomers can be used individually or as mixtures. Acrylic acid, methacrylic acid and a mixture thereof are particularly preferred.

The amount of associative monomers b) is preferably from 0.1 to 10% by weight, particularly preferably not more than 5% by weight or not more than 2% by weight, for example from 0.1 to 5% by weight or from 0.2 to 2% by weight, based on the sum of all monomers. Associative monomers are surface-active substances which are capable of free radical polymerization and have both hydrophilic and hydrophobic groups. Hydrophobic groups are, for example, $C_8$-$C_{30}$-alkyl groups or $C_8$-$C_{30}$-alkaryl groups. Hydrophilic groups are, for example, polyethylene oxide groups having at least two ethylene oxide units. The associative monomers have the general formula $$H_2C=CR^1—COO-(EO)_n—(PO)_m—R^2$$

in which $R^1$ is hydrogen or methyl, n is a number of at least two, preferably from 6 to 100 or from 10 to 40, m is a number from zero to 50, preferably from zero to 20, EO is an ethylene oxide group (—$CH_2$—$CH_2$—O—), PO is a propylene oxide group (—$CH_2$—$CH(CH_3)$—O—) and $R^2$ is a $C_8$-$C_{30}$-alkyl group or a $C_8$-$C_{30}$-alkaryl group, n preferably being greater than or equal to m and n+m preferably being from 6 to 100 or from 10 to 40.

Associative monomers b) are, for example, those of the formulae (III) to (VI) of EP 0011806. For example surface-active alkylphenoxypoly(ethyleneoxy)ethyl (meth)acrylate esters of the formula $$Ar\text{—}O\text{-}(EO)_n\text{—}CO\text{—}CR\text{=}CH_2$$

in which Ar is a phenyl group substituted by a $C_8$-$C_{16}$-alkyl group, R is H or $CH_3$, EO is an ethylene oxide group —$C_2H_4O$— and n is a number from 6 to 100, preferably from 10 to 40 are suitable.

For example, alkoxypoly(ethyleneoxy)ethyl (meth)acrylate esters of the formula $$R''\text{—}O\text{-}(EO)_n\text{—}CO\text{—}CR\text{=}CH_2$$

in which R'' is a $C_8$-$C_{20}$-alkyl group, R is H or $CH_3$, EO is an ethylene oxide group —$C_2H_4O$— and n is a number from 6 to 50, preferably from 10 to 40, are also suitable.

Alkoxypoly(alkyleneoxy)ethyl (meth)acrylate esters of the formula $$R'''\text{—}O\text{—}(PO)_m\text{-}(EO)_n\text{—}C_2H_4O\text{—}CO\text{—}CR\text{=}CH_2$$

in which R'' is a $C_8$-$C_{20}$-alkyl group, R is H or $CH_3$, EO is an ethylene oxide group —$C_2H_4O$—, PO is a propylene oxide group —$CH_2$—$CH(CH_3)$—O—, n is a number from 6 to 50, preferably from 10 to 40, and m is a number from 1 to 40, are also suitable.

Particularly preferred monomers b) have the general formula $$H_2C\text{=}CR^1\text{—}COO\text{-}(EO)_n\text{—}R^2$$

in which $R^1$ is hydrogen or methyl, n is a number from 10 to 40 and $R^2$ is a $C_{10}$- to $C_{30}$-alkyl group. For example, a methacrylate of a $C_{16}$-$C_{18}$-fatty alcohol mixture ethoxylated with about 25 mol of ethylene oxide and obtainable under the name PLEX® 6954-O is suitable.

The amount of copolymerizable nonionic monomers c) is preferably from 20 to 70% by weight or from 25 to 60% by weight or from 30 to 58% by weight, based on the sum of all monomers. Nonionic monomers c) may be those of the general formula $$CH_2\text{=}CYZ$$

in which Y is H, $CH_3$ or chlorine; Z is COOR, $CONH_2$, CONHR, $CONR_2$, $C_6H_4R'$, CN, Cl, —OCOR'' or CH=$CH_2$; R is $C_1$-$C_8$-alkyl or $C_2$-$C_8$-hydroxyalkyl; R' is H, Cl, Br or $C_1$-$C_4$ and R'' is $C_1$-$C_8$-alkyl. Preferred nonionic monomers are those in which Z is COOR, $CONH_2$, CONHR, $CONR_2$, $C_6H_4R'$, CN, Cl, —OCOR'' or CH=$CH_2$ if Y is H; or Z is COOR, $CONH_2$, CONHR, $CONR_2$, $C_6H_4R'$, CN or CH=$CH_2$ if Y is $CH_3$; or Z is Cl if Y is Cl.

Nonionic monomers c) can be selected in particular from $C_1$-$C_{20}$-alkyl (meth)acrylates, vinyl esters of carboxylic acids comprising up to 20 carbon atoms, vinylaromatics having up to 20 carbon atoms, vinyl halides, aliphatic hydrocarbons having 2 to 8 carbon atoms and one or two double bonds, monomers comprising ether groups, in particular vinyl ethers of alcohols comprising 1 to 10 carbon atoms, and monomers having at least one nitrogen atom in the molecule or mixtures of these monomers. Nitrogen monomers are, for example, vinylcarboxamides, (meth)acrylamide, N-vinylformamide, N-vinylacetamide, N-methyl-N-vinylformamide, N-methyl-N-vinylacetamide, N-vinylpyrrolidone, N-vinylcaprolactam, vinylimidazole. Typical nonionic monomers c) are, for example, $C_1$-$C_8$-alkyl esters and $C_2$-$C_8$-hydroxyalkyl esters of acrylic acid or of methacrylic acid, for example ethyl acrylate, ethyl methacrylate, methyl methacrylate, 2-ethylhexyl acrylate, butyl acrylate, butyl methacrylate, 2-hydroxyethyl acrylate, 2-hydroxybutyl methacrylate; styrene, vinyltoluene, tert-butylstyrene, isopropylstyrene, p-chlorostyrene; vinyl acetate, vinyl butyrate, vinyl caprolate; acrylonitrile, methacrylonitrile, butadiene, isoprene, vinyl chloride, vinylidene chloride and the like. Preferred nonionic monomers c) are selected from the group consisting of acrylates of monohydric alcohols having 1 to 20 carbon atoms and methacrylates of monohydric alcohols having 1 to 20 carbon atoms.

The associative thickeners according to the invention can be prepared by free radical polymerization, in particular by emulsion polymerization. In the emulsion polymerization, as a rule ionic and/or nonionic emulsifiers and/or protective colloids or stabilizers are used as surface-active compounds in order to promote the dispersing of the monomers in the aqueous medium. The emulsifiers are preferably anionic or nonionic emulsifiers. Suitable emulsifiers are, for example, ethoxylated $C_8$- to $C_{36}$- or $C_{12}$- to $C_{18}$-fatty alcohols having a degree of ethoxylation of from 3 to 50 or from 4 to 30, ethoxylated mono-, di- and tri-$C_4$- to $C_{12}$- or $C_4$- to $C_9$-alkylphenols having a degree of ethoxylation of from 3 to 50, alkali metal salts of dialkyl esters of sulfosuccinic acid, alkali metal and ammonium salts of $C_8$- to $C_{12}$-alkylsufates, alkali metal and ammonium salts of $C_{12}$- to $C_{18}$-alkanesulfonic acids and alkali metal and ammonium salts of $C_9$- to $C_{18}$-alkylarylsulfonic acids. Cationic emulsifiers are, for example, compounds having at least one amino or ammonium group and at least one $C_8$-$C_{22}$-alkyl group. Further suitable emulsifiers are compounds of the general formula

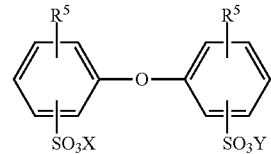

in which $R^5$ and $R^6$ are hydrogen or $C_4$- to $C_{14}$-alkyl and are not simultaneously hydrogen, and X and Y may be alkali metal ions and/or ammonium ions. Preferably, $R^5$, $R^6$ are linear or branched alkyl radicals having 6 to 18 carbon atoms or hydrogen and in particular having 6, 12 and 16 carbon atoms, $R^5$ and $R^6$ not both simultaneously being hydrogen. X and Y are preferably sodium, potassium or ammonium ions, sodium being particularly preferred. Compounds II in which X and Y are sodium, $R^5$ is a branched alkyl radical having 12 carbon atoms and $R^6$ is hydrogen or $R^5$ are particularly advantageous. Industrial mixtures which have a proportion of from 50 to 90% by weight of the monoalkylated product, for example Dowfax® 2A1 (trademark of Dow Chemical Company) are frequently used. Suitable emulsifiers are also described in Houben-Weyl, Methoden der organischen Chemie, Volume 14/1, Makromolekulare Stoffe, Georg Thieme Verlag, Stuttgart, 1961, pages 192 to 208. Trade names of emulsifiers are, for example, Dowfaxe 2 A1, Emulan® NP 50, Dextrol®OC 50, emulsifier 825, emulsifier 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. Copolymerized emulsifiers which comprise an ethylenically unsaturated double bond capable of free radical polymerization, for example reactive anionic emulsifiers, such as Adeka® Resoap SR-10, are also suitable.

The emulsion polymerization is effected as a rule at from 30 to 130, preferably from 50 to 90° C. The polymerization medium may consist only of water as well as of mixtures of water and liquids miscible therewith, such as methanol. Preferably, only water is used. The emulsion polymerization can be carried out both as a batch process and in the form of a feed process, including step or gradient procedure. The feed process in which a part of the polymerization batch is initially taken, heated to the polymerization temperature and prepolymerized and the remainder of the polymerization batch is then fed in continuously or stepwise, usually over a plurality of spatially separate feeds, one or more of which comprise the monomers in pure or in emulsified form is preferred.

In the emulsion polymerization, the customary and known assistants, such as, for example, water-soluble initiators and chain-transfer agents, can be used. Initiators which form free radicals under the reaction conditions are usually used in the emulsion polymerization. The amount of initiators is in general from 0.1 to 10% by weight or from 0.5 to 5% by weight, based on the monomers to be polymerized. The initiators are preferably used in amounts of up to 2% by weight, and preferably at least 0.9% by weight, for example from 1.0 to 1.5% by weight, based on the monomers to be polymerized. Suitable polymerization initiators are, for example, peroxides, hydroperoxides, hydrogen peroxide, sodium or potassium persulfate, redox catalysts and azo compounds, such as 2,2-azobis(4-methoxy-2,4-dimethylvaleronitrile), 2,2-azobis(2,4-dimethylvaleronitrile) and 2,2-azobis(2-amidinopropane) dihydrochloride. Examples of further suitable initiators are dibenzoyl peroxide, tert-butyl perpivalate, tert-butyl per-2-ethylhexanoate, di-tert-butyl peroxide, diamyl peroxide, dioctanoyl peroxide, didecanoyl peroxide, dilauroyl peroxide, bis(o-toluoyl) peroxide, succinyl peroxide, tert-butyl peracetate, tert-butyl permaleate, tert-butyl perisobutyrate, tert-butyl perpivalate, tert-butyl peroctanoate, tert-butyl perbenzoate, tert-butyl hydroperoxide, azobisisobutyronitrile, 2,2'-azobis(2-methylbutyronitrile), 2,2'-azobis(2,4-dimethylvaleronitrile) and 2,2'-azobis(N,N'-dimethyleneisobutyroamidine) dihydrochloride. Initiators are preferably selected from the group consisting of the peroxodisulfates, peroxosulfates, azoinitiators, organic peroxides, organic hydroperoxides and hydrogen peroxide. So-called reduction-oxidation (redox) initiator systems are also suitable. The redox initiator systems consist of at least one generally inorganic reducing agent and an inorganic or organic oxidizing agent. The oxidizing component is, for example, the initiators already mentioned above for the emulsion polymerization. The reducing components are, for example, alkali metal salts of sulfurous acid, such as, for example, sodium sulfite, sodium hydrogen sulfite, alkali metal salts of disulfurous acid, such as sodium disulfite, bisulfite adducts of aliphatic aldehydes and ketones, such as acetone bisulfite, or reducing agents such as hydroxymethanesulfinic acid and salts thereof, or ascorbic acid. The redox initiator systems can be used with concomitant use of soluble metal compounds whose metallic component can occur in a plurality of valency states. Customary redox initiator systems are, for example, ascorbic acid/iron (II) sulfate/sodium peroxodisulfate, tert-butyl hydroperoxide/sodium disulfite, tert-butyl hydroperoxide/sodium hydroxymethanesulfinic acid or tert-butyl hydroperoxide/ascorbic acid. The individual components, for example the reducing component, may also be mixtures, for example a mixture of the sodium salt of hydroxymethanesulfinic acid and sodium disulfite. Said compounds are generally used in the form of aqueous solutions, the lower concentration being determined by the amount of water acceptable in the dispersion and the upper concentration by the solubility of the relevant compound in water. Water-soluble initiators, e.g. sodium persulfate, potassium persulfate, ammonium persulfate, sodium peroxodisulfate, potassium peroxodisulfate and/or ammonium peroxodisulfate, are particularly preferably used. The polymerization can also be initiated with the aid of high-energy beams, such as electron beams or by irradiation with UV light. A plurality of different initiators may also be used in the emulsion polymerization.

Chain-transfer agents can be used in the polymerization, for example in amounts of from 0 to 0.8 part by weight or from 0.05 to 0.5 part by weight, based on 100 parts by weight of the monomers to be polymerized, with the result that the molar mass is reduced. For example, compounds having a thiol group, such as tert-butyl mercaptan, thioglycolic acid ethyl acrylic ester, mercaptoethanol, mercaptopropyltrimethoxysilane or tert-dodecylmercaptan, are suitable. It is furthermore possible to use chain-transfer agents without a thiol group, such as, for example, terpinolene. In a preferred embodiment, the emulsion polymer is prepared without use of chain-transfer agents.

Characteristic of the associative thickeners according to the invention is that the initially formed reaction product is subjected to an aftertreatment after the actual polymerization and is reacted with initiators forming nonionic radicals. The nonionic radicals are preferably hydroxyl radicals, which are formed, for example, from hydrogen peroxide or from organic hydroperoxides, or are alkoxy radicals, as are formed, for example, from organic alkyl peroxides. Examples of initiators for the aftertreatment are hydrogen peroxide, dibenzoyl peroxide, tert-butyl perpivalate, tert-butyl per-2-ethylhexanoate, di-tert-butyl peroxide, diamyl peroxide, dioctanoyl peroxide, didecanoyl peroxide, dilauroyl peroxide, bis(o-toluoyl) peroxide, succinyl peroxide, tert-butyl peracetate, tert-butyl permaleate, tert-butyl perisobutyrate, tert-butyl perpivalate, tert-butyl peroctanoate, tert-butylperbenzoate, tert-butyl hydroperoxide. Peroxide compounds which are selected from hydrogen peroxide, organic peroxides and organic hydroperoxides are preferably used.

It is particularly preferable if a redox initiator system is used for the aftertreatment, the oxidizing component used being at least one peroxide compound selected from hydrogen peroxide, organic peroxides and organic hydroperoxides and the reducing component used being an inorganic or organic reducing agent. The reducing components are, for example, alkali metal salts of sulfurous acid, such as, for example, sodium sulfite, sodium hydrogen sulfite, alkali metal salts of disulfurous acid, such as sodium disulfite, bisulfite adducts of aliphatic aldehydes and ketones, such as acetone bisulfite, or reducing agents such as hydroxymethanesulfinic acid and salts thereof, or ascorbic acid. The redox initiator systems for the aftertreatment can be used with concomitant use of soluble metal compounds whose metallic component may occur in a plurality of valency states. Redox initiator systems are, for example, ascorbic acid/iron(II) sulfate/sodium peroxodisulfate, tert-butyl hydroperoxide/sodium disulfite, tert-butyl hydroperoxide/sodium hydroxymethanesulfinic acid or tert-butyl hydroperoxide/ascorbic acid. The individual components, for example the reducing component, may also be mixtures, for example a mixture of the sodium salt of hydroxymethanesulfinic acid and sodium disulfite. Hydrogen peroxide/ascorbic acid and tert-butyl hydroperoxide/ascorbic acid are particularly suitable for the aftertreatment.

The amounts of initiator which are used for the aftertreatment are preferably from 0.001 to 0.1 part by weight, particularly preferably from 0.002 to 0.5 part by weight, based on 100 parts by weight of monomers.

The addition of the initiators for the aftertreatment is effected after the main polymerization of the monomers has taken place, i.e. after preferably more than 50% by weight, in particular at least 70% by weight or at least 90% by weight or particularly preferably 100% by weight of all monomers have been added and preferably more than 50% by weight, in particular at least 70% by weight or at least 90% by weight of all monomers have undergone polymerization.

The aftertreatment with initiators forming the nonionic radicals is preferably effected at temperatures of at least 60° C., particularly preferably of at least 70° C., for example at 60-130° C. or 70-90° C.

In a preferred embodiment, the associative thickener according to the invention is formed by free radical polymerization of a) from 25 to 55% by weight of at least one acid monomer selected from acrylic acid, methacrylic acid and a mixture thereof;

b) from 0.1 to 5% by weight of at least one associative monomer of the general formula $$H_2C=CR^1-COO-(EO)_n-R^2$$

in which $R^1$ is hydrogen or methyl, n is a number from 10 to 40 and $R^2$ is a $C_{10}$- to $C_{30}$-alkyl group, c) from 20 to 70% by weight of nonionic, copolymerizable monomers differing from a) and b) and selected from those of the general formula $$CH_2=CYZ$$

in which Y is H, $CH_3$ or chlorine; Z is COOR, $CONH_2$, CONHR, $CONR_2$, $C_6H_4R'$, CN, Cl, —OCOR" or $CH=CH_2$; R is $C_1$-$C_8$-alkyl or $C_2$-$C_8$-hydroxyalkyl; R' is H, Cl, Br or $C_1$-$C_4$ and R" is $C_1$-$C_8$-alkyl, the initiator for the reaction of the reaction product after the polymerization being a redox initiator system, the oxidizing component used being at least one peroxide compound selected from hydrogen peroxide, organic peroxides and organic hydroperoxides, and the reducing component used being an inorganic or organic reducing agent.

The invention also relates to a process for the preparation of the associative thickener described above, in which a monomer mixture comprising a) at least one acid monomer selected from ethylenically unsaturated $C_3$- to $C_8$-carboxylic acids;

b) at least one associative monomer of the general formula $$H_2C=CR^1-COO-(EO)_n-(PO)_m-R^2$$

in which $R^1$ is hydrogen or methyl, n is a number of at least two, m is a number from zero to 50, EO is an ethylene oxide group, PO is a propylene oxide group and $R^2$ is a $C_8$-$C_{30}$-alkyl group or a $C_8$-$C_{30}$-alkaryl group, and c) nonionic, copolymerizable monomers differing from a) and b) are subjected to free radical polymerization and the reaction product is reacted, after the polymerization as described above, with initiators forming nonionic radicals.

The associative thickeners according to the invention are preferably used in the form of aqueous thickener compositions. The invention therefore also relates to aqueous thickener compositions which comprise at least one associative thickener according to the invention in an amount of, preferably, from 20 to 40% by weight or from 25 to 30% by weight, dispersed in water. The dispersion is preferably stabilized with surfactants. The pH is preferably from 2.0 to 3.5.

The associative thickeners according to the invention are preferably used as thickeners for paper coating slips. The invention therefore also relates to a paper coating slip comprising at least one associative thickener according to the invention, inorganic pigments, at least one binder and water and optionally further additives.

In addition to water, paper coating slips generally comprise pigments, binders and assistants for establishing the required rheological properties, e.g. thickeners. The pigments are usually dispersed in water. The paper coating slip comprises pigments in an amount of, preferably, at least 80% by weight, e.g. from 80 to 95% by weight or from 80 to 90% by weight, based on the total solids content. White pigments are particularly suitable. Suitable pigments are, for example, metal salt pigments, such as, for example, calcium sulfate, calcium aluminate sulfate, barium sulfate, magnesium carbonate and calcium carbonate, of which carbonate pigments, in particular calcium carbonate, are preferred. The calcium carbonate may be natural ground calcium carbonate (GCC), precipitated calcium carbonate (PCC), lime or chalk. Suitable calcium carbonate pigments are available, for example, as Covercarb® 60, Hydrocarb® 60 or Hydrocarb® 90 ME. Further suitable pigments are, for example, silicic acids, aluminum oxides, aluminum hydroxide, silicates, titanium dioxide, zinc oxide, kaolin, alumina, talc or silicon dioxide. Suitable further pigments are available, for example, as Capim® MP 50 (clay), Hydragloss® 90 (clay) or Talcum C10.

The associative thickeners according to the invention are used in the paper coating slips according to the invention for establishing the desired rheology. The amounts used are preferably from 0.05 to 5 or from 0.1 to 2 parts by weight, based on 100 parts by weight of pigments.

The paper coating slip comprises at least one binder. The most important functions of binders in paper coating slips are to bind the pigments to the paper and the pigments to one another and partly to fill cavities between pigment particles. For example, from 1 to 50 parts by weight, preferably from 1 to 25 parts by weight or from 5 to 20 parts by weight of an organic binder (solid, i.e. without water or other solvents liquid at 21° C., 1 bar) are used per 100 parts by weight of the pigments.

Suitable binders are natural binders, in particular starch-based binders, and synthetic binders, in particular emulsion polymers which can be prepared by emulsion polymerization. In this context, starch-based binders are to be understood as meaning any native, modified or degraded starch. Native starches may consist of amylose, amylopectin or mixtures thereof. Modified starches may be oxidized starch, starch esters or starch ethers. The molecular weight of the starch can be reduced by hydrolysis (degrades starch). Suitable degradation products are oligosaccharides or dextrins. Preferred starches are cereal, corn and potato starch. Cereal and corn starch are particularly preferred and cereal starch is very particularly preferred. In the case of the use of synthetic binders, natural binders, such as starch, can also be concomitantly used but are not absolutely essential.

The synthetic binders preferably comprise at least 40% by weight, preferably at least 60% by weight, particularly preferably at least 80% by weight, of so-called main monomers. The main monomers are selected from $C_1$-$C_{20}$-alkyl (meth)acrylates, vinyl esters of carboxylic acids comprising up to 20 carbon atoms, vinylaromatics having up to 20 carbon atoms, ethylenically unsaturated nitriles, vinyl halides, vinyl ethers of alcohols comprising 1 to 10 carbon atoms, aliphatic hydrocarbons having 2 to 8 carbon atoms and one or two double bonds or mixtures of these monomers. For example, alkyl (meth)acrylates having a $C_1$-$C_{10}$-alkyl radical, such as methyl methacrylate, methyl acrylate, n-butyl acrylate, ethyl acrylate and 2-ethylhexyl acrylate, may be mentioned. In particular, mixtures of alkyl (meth)acrylates are also suitable. Vinyl esters of carboxylic acids having 1 to 20 carbon atoms are, for example, vinyl laurate, vinyl stearate, vinyl propionate, vinyl versatate and vinyl acetate.

Suitable vinylaromatic compounds are vinyl toluene, α- and p-methylstyrene, α-butyl-styrene, 4-n-butylstyrene, 4-n-decylstyrene and preferably styrene. Examples of nitriles are acrylonitrile and methacrylonitrile. The vinyl halides are ethylenically unsaturated compounds substituted by chlorine, fluorine or bromine, preferably vinyl chloride and vinylidene chloride. For example, vinyl methyl ether or vinyl isobutyl ether may be mentioned as vinyl ethers. Vinyl ethers of alcohols comprising 1 to 4 carbon atoms are preferred. Ethylene, propylene, butadiene, isoprene and chloroprene may be mentioned as hydrocarbons having 2 to 8 carbon atoms and one or two olefinic double bonds.

Preferred main monomers are $C_1$-$C_{10}$-alkyl (meth)acrylates and mixtures of alkyl (meth)acrylates with vinylaromatics, in particular styrene, or hydrocarbons having 2 double bonds, in particular butadiene, or mixtures of such hydrocarbons with vinylaromatics, in particular styrene. In the case of mixtures of aliphatic hydrocarbons (in particular butadiene) with vinylaromatics (in particular styrene), the ratio may be, for example, from 10:90 to 90:10, in particular from 20:80 to 80:20. Particularly preferred main monomers are butadiene and the abovementioned mixtures of butadiene and styrene.

In addition to the main monomers, the emulsion polymer suitable as a binder may comprise further monomers, for example monomers having carboxyl, sulfo or phosphonic acid groups. Carboxyl groups are preferred. For example, acrylic acid, methacrylic acid, itaconic acid, maleic acid or fumaric acid may be mentioned. The content of ethylenically unsaturated acids in the emulsion polymer is in general less than 10% by weight, preferably less than 8% by weight and at least 0.1% by weight or at least 1% by weight. Further monomers are also, for example, monomers comprising hydroxyl groups, in particular $C_1$-$C_{10}$-hydroxyalkyl (meth)acrylates, or amides, such as (meth)acrylamide.

Paper coating slips according to the invention may additionally comprise further additives and assistants, for example fillers, cobinders and further thickeners for further optimizing viscosity and water retention, optical brighteners, dispersants, surfactants, lubricants (e.g. calcium stearate and waxes), neutralizing agents (e.g. NaOH or ammonium hydroxide) for pH adjustment, antifoams, deaerating agents, preservatives (e.g. biocides), leveling agents, dyes (in particular soluble dyes), etc. Suitable further thickeners in addition to synthetic polymers (e.g. crosslinked polyacrylate) are in particular celluloses, preferably carboxymethylcellulose. Optical brighteners are, for example, fluorescent or phosphorescent dyes, in particular stilbenes.

It is preferably an aqueous paper coating slip; it comprises water, in particular from the preparation form of the constituents themselves (aqueous polymer dispersions, aqueous pigment slurries); the desired viscosity can be established by addition of further water. Customary solids contents of the paper coating slips are in the range from 30 to 70% by weight. The pH of the paper coating slip is preferably adjusted to values of from 6 to 10, in particular from 7 to 9.5.

A preferred embodiment of the invention relates to a paper coating slip comprising
(i) from 0.05 to 2 parts by weight, based on 100 parts by weight of pigments, of at least one above-described associative thickener according to the invention,
(ii) from 80 to 95% by weight, based on the total solids content, of pigments selected from calcium sulfate, calcium aluminate sulfate, barium sulfate, magnesium carbonate, calcium carbonate, silicic acids, aluminum oxides, aluminum hydroxide, silicates, titanium dioxide, zinc oxide, kaolin, alumina, talc and silicon dioxide,
(iii) from 1 to 25 parts by weight, preferably from 5 to 15 or from 8 to 10 parts by weight, of at least one binder.

The invention also relates to paper or cardboard coated with a paper coating slip according to the invention and a process for coating paper or cardboard, in which
an associative thickener according to the invention is prepared or is made available; and
a paper coating slip is prepared with this associative thickener, at least one pigment, at least one binder and optionally further assistants; and the paper coating slip is applied to at least one surface of paper or cardboard.

The paper coating slip is preferably applied to uncoated base papers or to uncoated cardboard. The amount is in general from 1 to 50 g, preferably from 5 to 30 g (solid, i.e. without water or other solvents which are liquid at 21° C., 1 bar), per square meter. The coating can be effected by customary application methods, for example by means of a size press, film press, blade coater, air brush, knife coater, curtain coating method or spray coater. Depending on the pigment system, the associative thickeners according to the invention can be used in paper coating slips for the base coat and/or for the top coat.

Paper coating slips according to the invention have good performance characteristics, in particular good rheological properties and good water retention properties. The coated papers and cardboards can be readily printed on in the customary printing processes, such as relief printing, gravure printing, offset printing, digital printing, inkjet printing, flexographic printing, newspaper printing, letterpress printing, sublimation printing, laser printing, electrophotographic printing or a combination of these printing processes.

EXAMPLES

Unless otherwise evident from the context, the data in percent are always percent by weight. The content data relate to the content in aqueous solution or dispersion.

Example 1

Preparation of an Associative Thickener

Deionized water (772 g) and emulsifier (Disponil® SDS, 8 g, 15% in water) are initially taken in a reactor having a stirrer apparatus, thermometer, nitrogen connections, reflux condenser and feed apparatus. The reactor is flushed with nitrogen and heated to 80° C. An aqueous emulsion is prepared from deionized water (186 g), emulsifier (Disponil ® SDS, 29.3 g, 15% in water), methacrylic acid (162 g), methacrylate of a $C_{16}$-$C_{18}$-fatty alcohol mixture ethoxylated with 25 mol of ethylene oxide (PLEX® 6954-O, 3.5 g, 60% strength) and ethyl acrylate (194.8 g). Sodium persulfate (11.4 g, 7% strength in water) is fed into the reactor, followed by the start of the monomer emulsion feed. The monomer emulsion is fed in continuously within a period of 2 hours. 20 minutes after the end of the monomer addition, hydrogen peroxide (0.13 g, 30% in water) and ascorbic acid (32 g, 2% in water) are added to the reactor in the course of 40 minutes. Cooling is effected and 60 g of water are added. An aqueous emulsion polymer having a solids content of 27.2% is obtained.

Example 2

Comparison, without RedOX Initiator System

As in example 1, without addition of hydrogen peroxide and without addition of ascorbic acid after the end of the monomer addition.

Example 3

Comparison, Aftertreatment with Sodium Persulfate

As in example 1, use of sodium persulfate instead of hydrogen peroxide as the oxidizing agent in the aftertreatment after the end of the monomer addition.

Example 4

Comparison, without Initiator Addition

As in example 1, without addition of hydrogen peroxide after the end of the monomer addition.

Paper coating slips are prepared with the aqueous associative thickener compositions of examples 1-4. The paper coating slips have the following compositions
100 parts by weight of pigment (finely divided calcium carbonate, Hydrocarb® 60, Omya)
10 parts by weight of binder (Styronal® D 628; aqueous dispersion of a polymer based on butadiene, styrene, acrylonitrile)
0.18 part by weight of thickener of examples 1-4
solids content: 65%
pH 8.5

In each case the viscosity and the water retention of the paper coating slips are measured. The results are summarized in table 1.

The (Brookfield) viscosity is measured as follows:
Viscosities of the paper coating slips are measured at room temperature (20° C.) using a Brookfield viscometer at 100 revolutions per minute and with spindle No. 2, 15 minutes after the preparation of the coating slip.

The water retention according to Gradek is measured as follows:

The water retention (WR) was measured by the GRADEK method. The method characterizes a coating slip with respect to its water retention in a standardized laboratory test. Good water retention is very important for the processing of a paper coating slip on large and high-speed paper coating plants. The coating slip to be tested is dewatered under defined conditions (pressure 1 bar, measuring time 1 minute) over a polycarbonate membrane in a filter paper layer. The amount of water taken up by the filter paper layer is determined gravimetrically. The greater the amount of water which has been taken up, the poorer is the water retention of the paper coating slip. The amount of water taken up is stated in g/m². Since deviations in the results of the measurement may occur with the use of different batches of the membrane filters, a comparison of different coating slips is carried out in each case using membrane filters of the same batch.

Devices and Materials Used:
Abo Akademi Gravimetric Water Retention pressure filtration device, balance, with which it is possible to measure with an accuracy of 0.1 mg, polycarbonate membrane filter, from Piper, pore size 5 μm, diameter 47 mm, Schwarzband filter paper, Schleicher & Schüll, diameter 9 cm, stopwatch

TABLE 1

Viscosity and water retention of the paper coating slips

| Example | Oxidizing agent | Reducing agent | Viscosity [mPa s] | Water retention [g/m²] |
|---|---|---|---|---|
| 1 | $H_2O_2$ | Ascorbic acid | 2284 | 71.6 |
| 2 | — | — | 1148 | 77.4 |
| 3 | Persulfate | Ascorbic acid | 1222 | 76.6 |
| 4 | — | Ascorbic acid | 1724 | 76.4 |

Example 1 shows that, with the use of associative thickeners according to the invention, paper coating slips having substantially improved viscosity and substantially improved water retention are obtained.

We claim:

1. An associative thickener formed by free radical polymerization of
   a) a methacrylic acid monomer present in an amount of 40 to 55% by weight, based on the sum of all monomers;
   b) 0.2 to 2% by weight of a methacrylate of a $C_{16}$-$C_{18}$-fatty alcohol mixture with 25 mol of ethylene oxide,
   c) an ethyl acrylate monomer in an amount of from 30 to 58% by weight, based on the sum of all monomers; the reaction product having been reacted, after the polymerization, with an initiator forming a nonionic radical, wherein the initiator is hydrogen peroxide and the reducing component is ascorbic acid.

2. The associative thickener of claim 1, wherein the reaction, after the polymerization, with the initiator is at a temperature of at least 60° C.

3. A process for the preparation of the associative thickener of claim 1, the process comprising subjecting the monomer mixture to free radical polymerization to form a product; and reacting, after the polymerizing, the product with an initiator forming a nonionic radical.

4. An aqueous thickener composition comprising at least one associative thickener of claim 1 dispersed in water.

5. A paper coating slip comprising at least one associative thickener of claim 1, an inorganic pigment, at least one binder and water.

6. The paper coating slip of claim 5, comprising
   (i) from 0.05 to 2 parts by weight, based on 100 parts by weight of the pigment, of the at least one associative thickener,
   (ii) from 80 to 95% by weight, based on the total solids content, of a pigment selected from the group consisting of calcium sulfate, calcium aluminate sulfate, barium sulfate, magnesium carbonate, calcium carbonate, silicic acid, aluminum oxide, aluminum hydroxide, silicate, titanium dioxide, zinc oxide, kaolin, alumina, talc and silicon dioxide,
   (iii) from 1 to 25 parts by weight of at least one binder.

7. A paper or cardboard coated with a paper coating slip of claim 5.

* * * * *